United States Patent

Matsumoto et al.

[11] 3,866,015
[45] Feb. 11, 1975

[54] FLUX-CORED ELECTRODE WIRE FOR NON-SHEILDED ARC WELDING

[75] Inventors: Tadashi Matsumoto, Kanagawa-ken; Takashi Yoshida, Tokyo, both of Japan

[73] Assignee: Nippon Steel Corporation, Chiyoda-ku, Tokyo, Japan

[22] Filed: Dec. 28, 1973

[21] Appl. No.: 429,199

[30] Foreign Application Priority Data
Dec. 29, 1972  Japan.................................. 47-3952
Feb. 26, 1973  Japan................................ 48-22989

[52] U.S. Cl.................... 219/146, 117/202, 148/24, 219/73, 219/145
[51] Int. Cl............................................. B23k 35/22
[58] Field of Search............... 117/202; 148/24, 26; 219/73, 145, 146

[56] References Cited
UNITED STATES PATENTS

| | | | |
|---|---|---|---|
| 2,552,104 | 5/1951 | Miller et al. | 148/26 |
| 3,320,100 | 5/1967 | Coless | 219/73 X |
| 3,424,892 | 1/1969 | Wilcox | 117/202 X |
| 3,513,289 | 5/1970 | Blake et al. | 219/146 |
| 3,531,620 | 9/1970 | Arikawa et al. | 219/146 |
| 3,598,170 | 8/1971 | Roberts | 148/26 X |
| 3,767,891 | 10/1973 | Haverstraw et al. | 219/146 |

FOREIGN PATENTS OR APPLICATIONS
586,194   3/1947   Great Britain....................... 148/26

*Primary Examiner*—J. V. Truhe
*Assistant Examiner*—N. D. Herkamp
*Attorney, Agent, or Firm*—Toren, McGeady and Stanger

[57] ABSTRACT

This invention is a flux-cored electrode wire for non-shielded arc welding with a powder flux filled in a hoop case, in which said flux comprises 20 – 70 percent of metal fluoride containing 1 – 30% of $CeF_2$ and/or LiF and 0.5 – 10 percent of a complex metal fluoride, 1 – 20 percent of metal carbonate, 10 – 30% of Al—Mg alloy (containing 30 – 60% of Al) in powder form and 5 – 40 percent of metal powder other than Al—Mg, or further comprises less than 30 percent of a metal oxide wherein the Si content in said flux is restricted to less than 2 percent, and the weight of flux to the total weight of the wire is 10 – 40 percent. Said wire is satisfactory with respect to its workability in automatic and semi-automatic arc welding, and gives an excellent weld metal having high toughness and ductility.

2 Claims, 9 Drawing Figures

FIG. 1

(1) FLUX/WIRE: 21% IN WT.
(2) WELDING CONDITION.
   DIAMETER OF WIRE: 2.4mm
   ELECTRIC CURRENT: 320 A, DC(-)
   ELECTRIC VOLTAGE: 30V.
(3) METHOD OF PREPARING WELD METAL:
   IN ACCORDANCE WITH JIS Z 3111.
(4) METAL CARBONATE: 9% $CaCO_3$.
(5) Si IN FLUX: 0.2%.
(6) COMPLEX FLUORIDE APPLIED: $K_2ZrF_6$.

(1) FLUX/WIRE: 21% IN WT.
(2) WELDING CONDITION.
    DIAMETER OF WIRE: 2.4mm
    ELECTRIC CURRENT: 320A, DC(-)
    ELECTRIC VOLTAGE: 30V
(3) METHOD OF PREPARING WELD METAL:
    IN ACCORDANCE WITH JIS Z 3111
(4) METAL CARBONATE: 10%, $CaCO_3$.
(5) Si IN FLUX: 0.3%
(6) COMPLEX FLUORIDE APPLIED: $K_2ZrF_6$

FIG. 2

(1) FLUX/WIRE: 21% IN WT.
(2) WELDING CONDITION
    DIAMETER OF WIRE: 2.4mm
    ELECTRIC CURRENT: 320 A, DC(-)
    ELECTRIC VOLTAGE: 30V
(3) METHOD OF PREPARING WELD METAL:
    IN ACCORDANCE WITH JIS Z 3111.
(4) METAL CARBONATE: 10%, $CaCO_3$
(5) ($LiF + CeF_2$ + COMPLEX FLUORIDE) / TOTAL FLUORIDE: 10%
(6) COMPLEX FLUORIDE / TOTAL FLUORIDE: 2.5%
(7) COMPLEX FLUORIDE APPLIED: $K_2ZrF_6$

FIG. 3

(1) FLUX/WIRE: 21% IN WT.
(2) WELDING CONDITION
    DIAMETER OF WIRE: 2.4mm
    ELECTRIC CURRENT: 320A, DC(-)
    ELECTRIC VOLTAGE: 30V
(3) METHOD OF PREPARING WELD METAL:
    IN ACCORDANCE WITH JIS Z 3111
(4) $(LiF + CeF_2 + Na_2ZrF_6)$/ TOTAL FLUORIDE: 10%
(5) Si IN FLUX: 1.2%
(6) METAL CARBONATE APPLIED: $CaCO_3$

FLUX-CORED ELECTRODE WIRE FOR NON-SHEILDED ARC WELDING

This invention relates to a welding material used for the so-called non-shielded arc welding which uses neither a shielding gas nor a scattered flux material to prevent the harmful influences of the air in automatic or semi-automatic arc welding, i.e., a welding material in which a powder flux is filled in the interior of a welding wire.

When an arc welding is carried out in open air by using a bare wire, a large quantity of oxygen and nitrogen permeates into the molten steel to form pores and makes the weld metal brittle. In order to make such welding in the air possible with a flux-cored electrode wire, the flux to be filled up in a hoop case should have the following characteristics and effects, or the powder flux may be classified as;

1. the gas producing material,
2. the material which forms the slag and controls its physical properties,
3. the arc stabilizing material,
4. it contains the deoxidizing and denitrifying element, and the
5. alloy element and iron powder.

It has been proven by this invention that a weld metal having quite excellent toughness and bending ductility can be obtained in non-shielded arc welding by using a flux-cored electrode wire in which a powder flux comprising said materials and having the composition described hereinafter is filled up in a hoop case. The powder flux of the present invention comprises;

1. 20 – 70 percent of metal fluoride, 1 – 20 percent of metal carbonate, 10 – 30 percent of Al—Mg alloy and 5 – 40 percent of a metal powder other than Al—Mg, or comprising further less than 30 percent of metal oxide,
2. said metal fluoride containing 1 – 30% of $CeF_2$ and/or LiF and 0.5 – 10 percent of a complex metal fluoride to the total amount of the fluoride, and wherein
3. the total content of Si in the flux is less than 2 percent, where complex metal fluoride means, such as, fluorides as $K_2ZrF_6$, $Na_2ZrF_6$, $K_2TiF_6$ and $Na_2TiF_6$. It has also been ascertained that the amount of flux to be used in the wire is 10 —40 percent by weight of the total weight of the welding wire.

The reason why the constitution of the flux in the present inventive wire is defined as above mentioned and the flux possesses the above described characteristics will be explained referring to the attached drawings.

The main reason of using metal fluoride in the present inventive wire is that it produces shielding gas around the arc. $CaF_2$ is used in the main. While it is proved that fluorides other than $CaF_2$, such as NaF, KF, $AlF_3$ and $MgF_2$ have a shielding effect as well, they have no remarkable effect as a slag component to shield the molten metal as in the case of $CaF_2$. However, the addition of a small amount of alkali metal fluoride, such as, NaF and KF, has the effect of stabilizing the arc.

Particularly, as will be mentioned hereinafter, since a large amount of Al—Mg alloy is used in this invention, the amount of the components having a high melting point, such as, MgO and $Al_2O_3$, increases in the slag, and accordingly the slag is easily degradable. As a unique method of solving this problem, the use of a large amount of fluoride, particularly $CaF_2$, has succeeded in this invention by the joint use of a special fluoride, such as, $CeF_2$, LiF, and a complex fluoride as necessary constituents. The minimum amount of fluoride in total in the flux is defined as 20%. When the amount is less than 20 percent, the production of shielding gas is insufficient, and at the same time, as the amount of high melting components, such as, MgO and $Al_2O_3$ in the slag increases relatively, the shielding effect of the slag to the molten metal diminishes. As a consequence, the molten metal readily absorbs the components of the air, and the weld metal becomes not only brittle and hard but also porous. Such is one of the known defects encountered commonly in the non-shielded arc welding. From these points of view, the higher the amount of the metal fluoride, the the better. However, it has been proven in this invention that the upper limit should be defined as 70 percent, because, when the amount exceeds this limit, the melting point and the viscosity of the slag decrease substantially, and the physical properties of the slag are degraded, thus causing problems in the welding workability.

The effect of the special fluoride, including the $CeF_2$, LiF and complex metal fluoride, i.e., the essential feature of the invention, will be explained in the following. These fluorides volatilize readily by the heat of the welding arc to form a dense atmosphere which effectively shields from the air, the molten metal droplets as they are formed at the wire end and pass through the arc. The complex fluoride dissociate easily to form volatile fluorides, such as, $ZrF_4$, $TiF_4$, KF and NaF. Moreover, a part of Li, Ce, K and Na formed by the thermal dissociation of said fluorides exists as metallic ions and stabilizes the arc quite effectively, and the droplets are transmitted smoothly. Therefore, the absorption of air in the metal can be held to a minimum.

Figure 1:
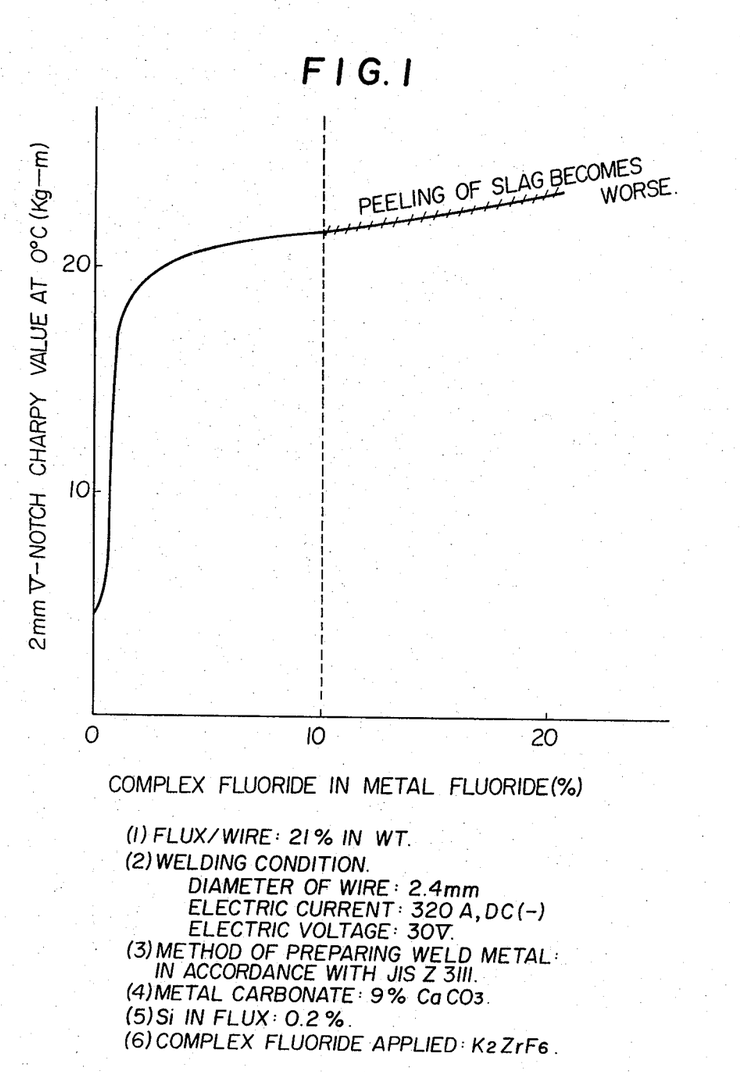
FIG. 1 is a graph showing the relation between the amount of complex metal fluoride in the metal fluoride and the impact toughness of the weld metal.

Elements, and as Zr and Ce from these fluorides remain in the weld metal in a small amount and makes the grain size of the weld metal fine, improving the toughness of the weld metal remarkably. However, it has been proven that the upper limit of the complex fluoride should be restricted to 10 percent of the total weight of the metal fluoride. Namely, as shown in FIG. 1, while the increasing amount of the complex fluoride is effective in improving the toughness of the weld metal, more than 10 percent reduces the welding workability and working efficiency, for instance substantially reducing the peeling of slag. The increase in the improvement of the impact toughness is also small with the addition of more than 10 percent. On the other hand, less than 0.5 percent can not contribute sufficiently to improving the impact toughness. LiF, which forms Li element by the thermal dissociation, is also an effective material having strong degassing and refining action.

Figure 2:
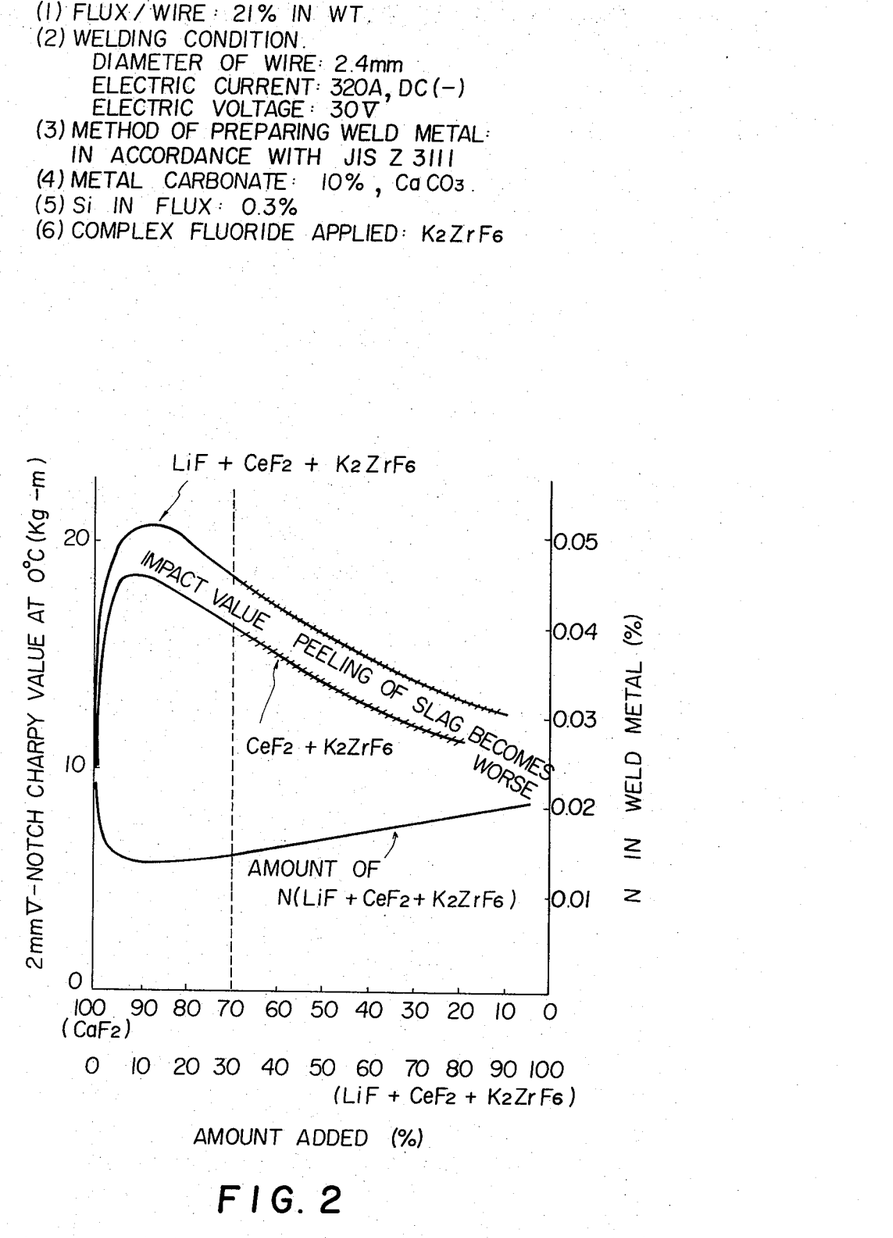
FIG. 2 is a graph showing the relation between the mixing ratio of $CaF_2$ and $(LiF + CeF_2 + K_2ZrF_6)$ in the metal fluoride and the impact value of the weld metal as well as the nitrogen content therein.

While the special fluoride selected in this invention exhibits, as above described, various excellent effects in its single use, it is further advantageous in that the toughness of the weld metal is improved astonishingly by the joint use thereof with $CaF_2$ under a mixing ratio as will be set forth hereinafter. As obvious from the experimental results in FIG. 2, when the amount of $CeF_2$ + LiF + complex fluoride in the total amount of fluorides becomes larger than 1 percent, the nitrogen content in the weld metal decreases suddenly and, at the same time, the 2 mm V-notch Charpy impact value at 0°C increases remarkably, reaching a maximum value of 21 kg-m at about 7 percent. From the above experimental results, it is suitable to define the lower limit as 1 percent. It is obvious that no distinct effect can be obtained below this limit. Beyond 7 percent, the toughness decreases gradually as the addition amount increases, although the impact value is still higher than the case of using a conventional wire. When the amount exceeds 30 percent, the peeling of the slag becomes remarkably worse, and there is a gradual increase in the nitrogen content at the same time. Therefore, the addition of more than 30 percent of the special fluoride is not desirable as a practical matter.

Although it is difficult to give an exact technical explanation of the above experimental results, so far can be understood, by the addition of a proper amount of said special fluoride, the amount of Al in the wire can be reduced due to the increase of the shielding effect. While Al is, as will be described hereinafter, a very effective element as a degassing agent in a wire for non-shielded arc welding, the presence of more than 1 percent thereof in the weld metal deteriorates its toughness. In the case of conventional welding wire, it is necessary that the weld metal contains more than 1 percent of Al. Below this range, there is a the defect that blow-holes and pits are easily formed in the weld metal.

The object of using Al—Mg alloy in the present inventive welding wire lies in the deoxidation and denitrification. For the purpose of deoxidation and denitrification, elements such as, Si, Ti, Zr and Ca have hitherto been employed besides Al and Mg. However, the present inventors have already found empirically that, when a large amount of elements other than Al and Mg are used in the non-shielded arc welding, the toughness of the weld metal deteriorates and the welding workability becomes worse, and that Al—Mg alloy, contrary to said degassing elements, does not possess such a bad influence and is quite effective in the deoxidation and denitrification in the non-shielded arc welding.

The most suitable composition of the Al—Mg alloy used as a material for non-shielded arc welding wire lies in the range, Al 30 – 60% and Mg 40 – 70%. Outside of this composition range, not only is the alloy difficultly pulverized owing to its ductility, but also the weld metal becomes brittle and porous. It is ascertained experimentally that the optimum addition range of Al—Mg alloy lies within 10 – 30 percent of the total of the flux. In increasing the addition amount of Al—Mg alloy to the flux, whereas the nitrogen content in the weld metal diminishes, there is the tendency of lowering the impact toughness at 0°C. It is considered that the lowering in the toughness is chiefly due to the increase of Al remaining in the weld metal, and that the reduction of the nitrogen content is due to the shielding effect of Mg as well as to the degassing effect of Al and Mg. When the amount of Al—Mg alloy is less than 10 percent, although the impact toughness is improved, pores are produced inexpediently in the weld metal perhaps owing to the insufficient deoxidation and denitrification. When the amount exceeds 30 percent, the mechanical properties of the weld metal, particularly the impact toughness, deteriorates due to the improper increase of Al content in the weld metal. Thus, the proper addition range of Al—Mg alloy is 10 – 30 percent.

Figure 3:
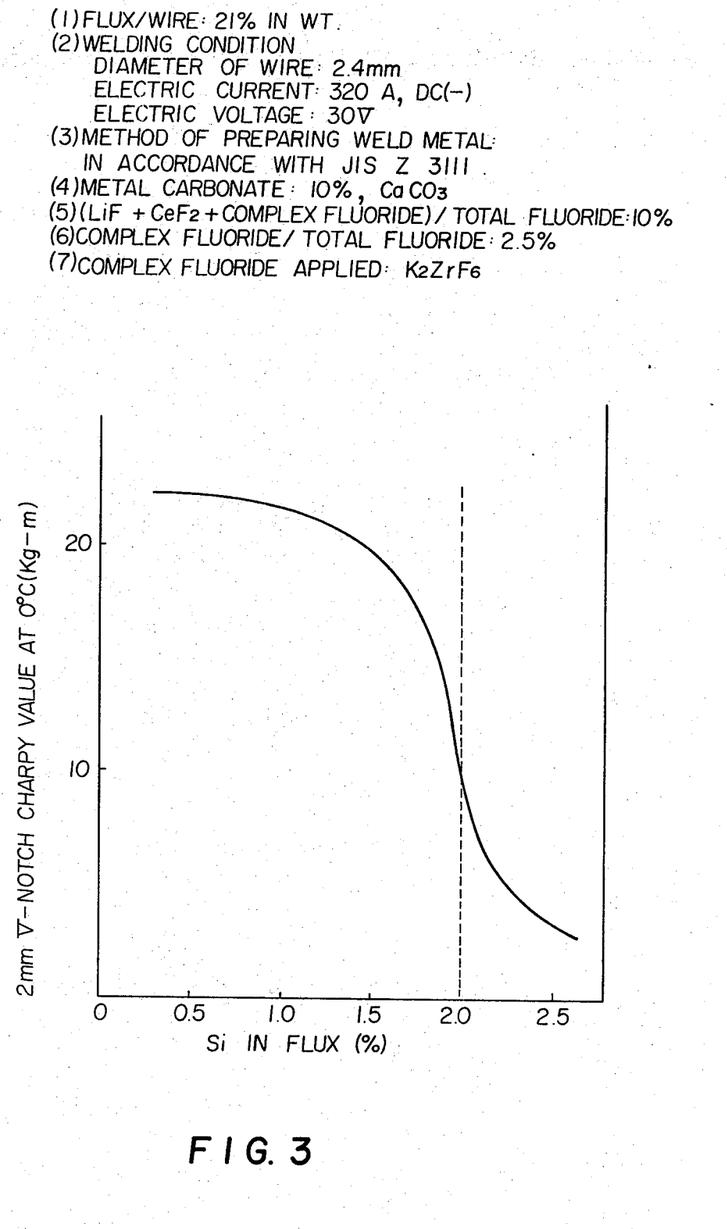
FIG. 3 shows the relation between the total amount of Si in the filled-up flux and the impact toughness of the weld metal.

It is a further characteristic of the present invention to reduce the amount of Si in the flux. It is confirmed by our investigation that a very close correlation exists between the content of Si in the flux and the impact toughness of the weld metal in using the present inventive wire. FIG. 3 shows the change of toughness of the weld metal in varying Si content in the flux. It is easily understood that the impact toughness decreases suddenly in the vicinity of 2.0 percent Si. In this invention, as Al—Mg alloy is used as a powerful deoxidizer, almost all the silicates are reduced to Si, and there is a tendency that Si remains in the weld metal. In the non-shielded arc welding, it is found that, Si makes, as well Al, the crystal grains in the weld metal coarse, and thus Si is a harmful element to lower the toughness. Since the present invention attaches importance to the toughness of the weld metal, the Si content in the filled-up flux should be restricted to less than 2 percent.

Figure 4:
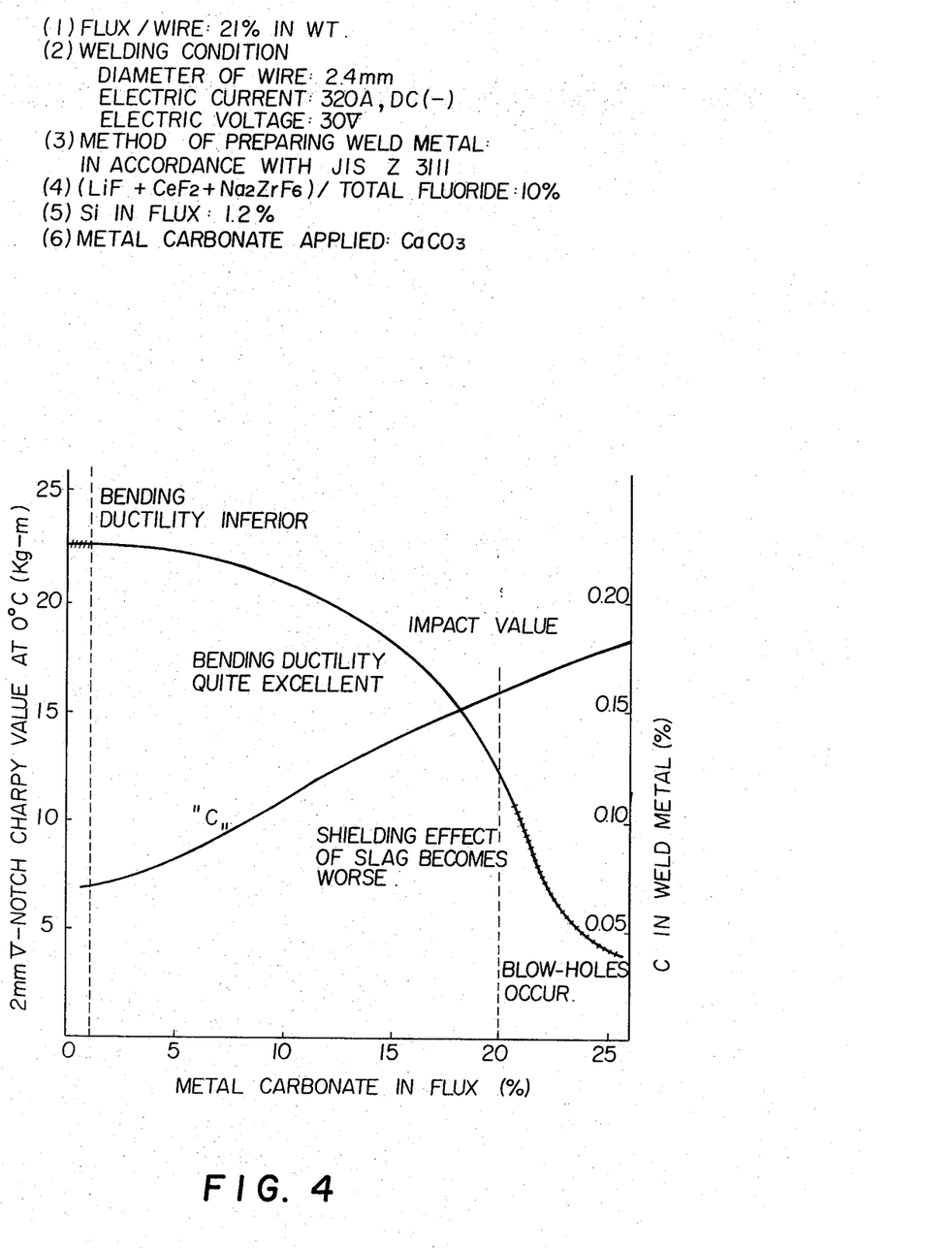
FIG. 4 is a graph showing the influence of the addition of metal carbonate on the carbon content in the weld metal and the impact toughness thereof.
Figure 5A:
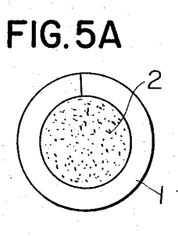
FIG. 5 is an explanatory drawing showing the examples of the sectional construction of the wire suitable for filling-up the flux in this invention.
Figure 5B:
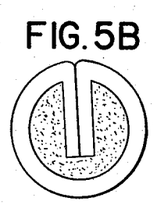
Figure 5C:
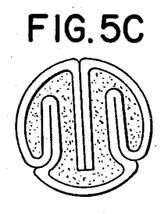
Figure 5D:
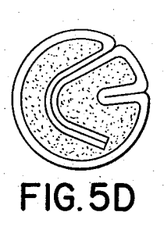
Figure 5E:
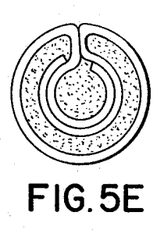

In this invention, 1 – 20 percent of metal carbonate is added to the flux. The metal carbonate comprises chiefly alkali- and alkaline-earth metal carbonates such as $Li_2Co_3$, $Na_2CO_3$, $K_2CO_3$, $CaCO_3$ and $MgCO_3$. The object of its addition lies chiefly in (1) the effect of stabilizing the arc, (2) the shielding of the air by the decomposed gas, (3) the spray effect of the arc by promoting the separation of droplets, and (4) the control of the physical properties of the slag. It is found further that (5) the addition of carbonate has the effect of making the crystals of the weld metal fine, and accordingly, to improve the bending ductility of the weld metal remarkably. As shown in FIG. 4, the addition of less than 1 percent can hardly exhibits said effects and rather deteriorates the bending ductility. On the other hand, the upper limit of the addition is defined as 20 percent. More than this limit makes the physical properties of the slag inferior, deteriorating the effect to shield the beads. As already mentioned, since a powerful deoxidizer, such as, Al—Mg is used in this invention, the addition of too much carbonate makes the carburizing of the weld metal remarkable, deteriorating its impact toughness seriously. It is not desirous practically. When a high impact value of the weld metal at lower temperatures is needed rather than an excellent bending ductility, it is clear from FIG. 4, to restrict the amount of metal carbonate to a lower value.

In this invention, 5 – 40 percent of metal powder other than Al and Mg is added to the flux, for instance, iron powder, to give a desired strength and ductility to the weld metal. Less than 5 percent has almost no effect. On the other hand, more than 40 percent is not favorable, because too much produces a relative decrease of other materials, such as, $CaF_2$ and Al—Mg alloy in the flux, causing the shortage in the effects of air shielding and degassing as well as the increase of spattering loss, and thus injuring the workability.

In the present inventive welding wire, metal oxides, such as, $MgO$, $Al_2O_3$, $TiO_2$, $ZrO_2$, $FeO$ and $Fe_2O_3$ may be used in an amount less than 30% per total flux. The object of using such a metal oxide is to improve the physical properties of the slag, the peeling of slag, and the shielding of the bead, which may sometimes be deteriorated by the addition of said special fluoride. The use of more than 30% thereof results in lowering the ratio of fluoride and other to the total amount of the flux, thus injuring the effects of the air shielding towards improving the toughness.

In the present inventive wire, the amount of the flux to the total amount of the wire is defined as 10 – 40 percent. When the amount of the flux is less than 10 percent, no satisfactory effect can be expected, forming numerous pores in the weld metal or injuring the bead shielding effect of the slag. On the other hand, when the amount is larger than 40 percent, the slag amount becomes too much, and consequently the welding in the notch becomes difficult, the amount of Al and alloy elements increases in the weld metal, and the anticipated mechanical properties are difficult to obtain.

In FIG. 5, A, B, C, D, and E, are, respectively the section of the wire suitable for filling-up the flux in this invention, wherein 1 is the metal material to construct the hoop case and 2 is the flux as filled-up in the hoop case. The hoop case is generally made of mild steel. For the welding of special steels, stainless steel may also be used. The object of the hoop case is to hold the filled-up flux completely, to produce an arc uniformly from the total surface of the wire section during welding and to melt the flux uniformly. Therefore, its sectional construction is desirously turned up to the inside such as in B, C, D and E. However, it is confirmed that, when a direct electric current is applied for welding, the simple and cheap construction in A gives generally a satisfactory result.

EXAMPLE:

The flux with the present inventive constitution as above mentioned was used in a wire, and its quality was compared with that of the conventional wire. The result is as shown in Tables 1 and 2. As obvious from the tables, in using all the wires with the inventive flux, the welding workability is excellent, and the weld part obtained is satisfactory in X-ray test and is superior in bending ductility as well as impact toughness.

On the contrary, in using wires for reference with the flux whose composition is outside the scope defined in the present invention, the weld part obtained is inferior to the inventive case in either of the X-ray test, bending ductility, impact toughness and peeling of slag. Particularly, when the amount of special fluoride exceeds the inventive upper limit (No. 5 and 10), cracking occurs in the bending test piece, and thus the bending property is quite inferior.

Table 1  Prescription of Wire

| Feature of Wire | Effect of Special Fluoride | | | | | Effect of Complex Fluoride | | | | | Effect of Carbonate | | | Effect of Si | | 60 Kg-Steel |
|---|---|---|---|---|---|---|---|---|---|---|---|---|---|---|---|---|
| | CeF$_2$, LiF and complex Fluoride | | | | | | | | | | | | | | | |
| Steel Grade Applied | Mild Steel | | | | | | | | | | | | | | | |
| Wire No. | 1* | 2 | 3 | 4 | 5* | 6* | 7 | 8 | 9 | 10* | 11* | 12 | 13* | 14* | 15 | 16 |
| CaF$_2$ | 60 | 53 | 55 | 45 | 41 | 45 | 45 | 42 | 46 | 44 | 60 | 52 | 40 | 47 | 49 | 50 |
| CeF$_2$ | - | 1.8 | 2 | 6 | 15 | 2 | 2 | 2 | 2 | 2 | 2 | 2 | 2 | 1.5 | 1.5 | 2 |
| LiF | - | 1.8 | - | 6 | 11 | 2 | 2 | 2 | 2 | 2 | 2 | 2 | 2 | 1.5 | 1.5 | 2 |
| K$_2$ZrF$_6$ | - | 1.5 | - | 5 | - | 0.2 | 0.5 | 1.5 | 5 | 8 | 1 | 1 | 1 | - | - | 1.5 |
| Na$_2$ZrF$_6$ | - | - | 1.5 | - | 2 | - | - | - | - | - | - | - | - | 1 | 1 | - |
| CaCO$_3$ | 10 | 8 | 10 | 8 | 10 | 8 | 8 | 10 | 10 | 10 | - | - | 13 | - | - | 5 |
| MgCO$_3$ | - | 4 | - | 4 | - | 2 | 2 | - | - | - | - | 13 | 25 | 8 | 8 | 5 |
| Aℓ-Mg (40% Mg) | 18 | 17 | 17 | 17 | 17 | 17 | 16 | 16 | 16 | 16 | 19 | 18 | 20 | 15 | 15 | 17 |
| Fe-Mn (80% Mn) | 3 | 3 | 3 | 3 | 3 | 3 | 3 | 3 | 3 | 3 | 2 | 2 | 2 | 2 | 2 | 7 |

Constitution of Flux

Table 1 (cont'ed).

| Constitution of Flux | | | | | | | | | | | | | | | | |
|---|---|---|---|---|---|---|---|---|---|---|---|---|---|---|---|---|
| Ni | 2 | 2 | 2 | 2 | 2 | 2 | 2 | 2 | 2 | 3 | 3 | 3 | 3 | 3 | 3 | 3 |
| Fe-Mo (55% Mo) | - | - | - | - | - | - | - | - | - | - | - | - | - | - | - | - |
| Fe | 4 | 2 | 10 | 6 | - | 13 | 14 | 13 | 9 | 10 | 10 | 15 | 7 | 11 | 11 | - |
| $SiO_2$ | 0.3 | 0.3 | 0.3 | 0.3 | 0.3 | 0.4 | 0.4 | 0.4 | 0.4 | 0.4 | 0.4 | 0.5 | 0.5 | 0.5 | 0.4 | 0.4 |
| MgO | 3 | 2 | 3 | 3 | 3 | 3 | 3 | 3 | 3 | 1 | 0 | 0 | 3 | 3 | 3 | 3.5 |
| $Al_2O_3$ | 3 | 2 | 3 | 3 | 3 | 3 | 3 | 3 | 3 | 1 | 0 | 2 | 4 | 4 | 2 | 2 |
| Total | 103.3 | 98.4 | 106.8 | 108.3 | 107.3 | 100.6 | 97.9 | 103.4 | 101.4 | 108.5 | 101.5 | 102 | 99.4 | 110.4 | | |
| LiF+$CeF_2$+complex fluoride in total of fluoride (%) | 0 | 8.7 | 6.0 | 27.4 | 40.5 | 8.5 | 9.0 | 11.5 | 16.3 | 21.4 | 7.6 | 8.7 | 7.8 | 7.5 | | 9.9 |
| Complex fluoride in total of fluoride (%) | 0 | 2.5 | 2.5 | 8.0 | 2.8 | 0.4 | 1.0 | 3.1 | 9.0 | 14.2 | 1.5 | 1.7 | 2.2 | 1.9 | 1.8 | 2.7 |
| Powder flux/wire (wt.%) | 20.8 | 20.4 | 21.0 | 20.8 | 20.7 | 22.4 | 22.4 | 21.6 | 21.4 | 22.0 | 21.0 | 21.6 | 21.0 | 22.0 | 21.7 | 21.0 |
| Grade of hoop case metal | Mild Steel | | | | | | | | | | | | | | | |

\* Wire for reference

TABLE 2.—TESTING RESULT

| | Feature of wire at— | | | | | | | | | | | | | | | |
|---|---|---|---|---|---|---|---|---|---|---|---|---|---|---|---|---|
| | Effect of special fluoride | | | | | | | | | | | | | | Effect of Si | |
| | CeF₃, LiF and complex fluoride | | | | Effect of carbonate | | | | Complex fluoride | | | | | | | |
| Steel grade applied | Mild steel | | | | | | | | | | | | | | | 60 kg. steel |
| Wire No. | *1 | 2 | 3 | 4 | *5 | *6 | 7 | 8 | 9 | *10 | *11 | 12 | *13 | *14 | 15 | 16 |
| Properties of weld metal: | | | | | | | | | | | | | | | | |
| Chemical analyses of weld metal (percent): | | | | | | | | | | | | | | | | |
| C | 0.12 | 0.12 | 0.12 | 0.11 | 0.13 | 0.13 | 0.12 | 0.11 | 0.13 | 0.13 | 0.05 | 0.12 | 0.18 | 0.12 | 0.11 | 0.12 |
| Si | 0.10 | 0.08 | 0.11 | 0.10 | 0.07 | 0.08 | 0.09 | 0.08 | 0.09 | 0.09 | 0.08 | 0.07 | 0.10 | 0.48 | 0.11 | 0.09 |
| Mn | 0.67 | 0.74 | 0.69 | 0.70 | 0.67 | 0.71 | 0.71 | 0.73 | 0.70 | 0.71 | 0.54 | 0.51 | 0.50 | 0.50 | 0.45 | 1.34 |
| P | 0.013 | 0.013 | 0.010 | 0.012 | 0.011 | 0.012 | 0.010 | 0.011 | 0.011 | 0.011 | 0.013 | 0.013 | 0.011 | 0.015 | 0.011 | 0.011 |
| S | 0.005 | 0.002 | 0.004 | 0.002 | 0.003 | 0.003 | 0.004 | 0.004 | 0.002 | 0.003 | 0.008 | 0.004 | 0.003 | 0.004 | 0.005 | 0.003 |
| Ni | 0.42 | 0.43 | 0.42 | 0.41 | 0.37 | 0.38 | 0.39 | 0.40 | 0.42 | 0.41 | 0.59 | 0.68 | 0.72 | 0.63 | 0.67 | 1.10 |
| Al | 1.20 | 0.88 | 0.94 | 0.89 | 0.82 | 0.96 | 0.88 | 0.82 | 0.80 | 0.78 | 1.42 | 0.96 | 0.95 | 0.93 | 0.87 | 0.79 |
| Mo | | | | | | | | | | | | | | | | 0.56 |
| Cu | 0.03 | 0.05 | 0.04 | 0.05 | 0.04 | 0.05 | 0.04 | 0.04 | 0.04 | 0.05 | 0.06 | 0.04 | 0.03 | 0.05 | 0.04 | 0.05 |
| N | 0.035 | 0.018 | 0.021 | 0.019 | 0.024 | 0.021 | 0.017 | 0.017 | 0.016 | 0.018 | 0.030 | 0.024 | 0.023 | 0.016 | 0.017 | 0.017 |
| Tensile: | | | | | | | | | | | | | | | | |
| Yield point (kg./mm²) | 37.9 | 38.5 | 41.2 | 37.5 | 36.2 | 38.5 | 39.2 | 37.6 | 36.5 | 39.2 | 39.2 | 36.2 | 39.0 | 43.5 | 33.6 | 54.2 |
| Tensile strength (kg./mm²) | 51.4 | 52.4 | 51.9 | 49.5 | 48.2 | 48.6 | 49.6 | 49.5 | 51.2 | 48.6 | 51.0 | 43.5 | 49.0 | 52.9 | 45.8 | 68.2 |
| Elongation (kg./mm²) | 26.8 | 34.2 | 30.8 | 32.6 | 32.5 | 28.0 | 33.2 | 34.5 | 34.2 | 30.6 | 20.7 | 34.2 | 26.2 | 22.9 | 33.6 | 29.2 |
| Impact: | | | | | | | | | | | | | | | | |
| 2 mm. V notch | | | | | | | | | | | | | | | | |
| Charpy value (Kg.-m., 0° C.) | 7.9 | 19.2 | 12.9 | 19.5 | 17.2 | 12.5 | 17.6 | 20.2 | 22.4 | 22.0 | 20.9 | 19.6 | 3.4 | 3.8 | 22.8 | 16.5 |
| | 8.6 | 18.6 | 16.4 | 18.5 | 16.6 | 13.2 | 18.5 | 22.3 | 22.0 | 21.7 | 22.4 | 21.2 | 5.2 | 4.9 | 20.9 | 15.6 |
| | 6.4 | 21.2 | 15.6 | 19.2 | 16.8 | 12.6 | 18.3 | 21.5 | 20.6 | 22.9 | 21.6 | 18.6 | 2.8 | 4.2 | 21.4 | 16.0 |
| Bending (50t): | | | | | | | | | | | | | | | | |
| Occurrence of defect | No | No | No | 0.1 mm-1 (crack) | 3 mm-3, 1 mm-7 (crack) | No | No | No | 0.3 mm-2 (crack) | 3 mm-3, 5 mm-1 (crack) | 6 mm-2, 2 mm-3 (crack) | No | 0.2 mm-2, 2 mm-4 (crack) | 0.3 mm-2, 2 mm-4 (crack) | No | No |
| Decision | Pass 1 | Pass 1 | Pass 1 | Pass 1 | Rejected 2 | Pass 1 | Pass 1 | Pass 1 | Pass 1 | Rejected 1 | Rejected 1 | Pass 1 | Pass 2 | Rejected 2 | Pass 1 | Pass 1 |
| X-ray test (grade in JIS) | | | | | Slag rooled in 2 | | | | | Slag rooled in 2 | | | | | | |
| Workability: | | | | | | | | | | | | | | | | |
| Condition of arc | Good | Good | Good | Good | Good | Good | Good | Good | Good | Rather good | Good | Good | Rather good | Good | Good | Good |
| Shielding effect of slag | do | do | do | do | Rather good | do | do | do | do | do | do | do | Rather good | do | do | Do |
| Peeling of slag | do | do | do | Rather good | Inferior | do | do | do | Rather good | Inferior | do | do | Rather good | do | do | Do |

Remarks:
(1) *=Wire for reference.
(2) Shape of wire section, D in Fig. 5.
(3) Diameter of wire, 2.4 mm.
(4) Method of tensile test, in accordance with JIS Z 3111 at 0° C.
(5) Method of tensile test, in accordance with JIS Z 3111.
(6) X-ray test, in accordance with JIS Z 3104.

What is claimed is:

1. A flux-cored electrode wire for non-shielded arc welding with a powder flux filled in a hoop case, in which said powder flux comprises 20–70 percent of metal fluoride containing 1–30% of $CeF_2$, LiF or combinations thereof, and 0.5–10 percent of a complex metal fluoride, 1–20 percent of a metal carbonate, 10–30% of Al—Mg alloy containing 30–60% of Al in powder form and 5–40 percent of a metal powder other than Al—Mg, the Si content in said flux being less than 2 percent, and the weight of flux to the total weight of the wire being 10–40 percent.

2. A flux-cored electrode wire for non-shielded arc welding as set forth in claim 1, in which said powder flux comprises less than 30 percent of metal oxide.

* * * * *